United States Patent [19]
Lange

[11] Patent Number: 5,962,582
[45] Date of Patent: Oct. 5, 1999

[54] HYDROPHILIC SYNTHETIC RESINS, ESTERIFIED FOR STABILITY TO HYDROLYSIS, WHICH ARE PARTICULARLY SUITABLE FOR AQUEOUS SYSTEMS

[75] Inventor: Hartwig Lange, Haltern, Germany

[73] Assignee: Huels Aktiengesellschaft, Marl, Germany

[21] Appl. No.: 08/953,248

[22] Filed: Oct. 17, 1997

[51] Int. Cl.[6] .............................. C08G 6/00; C08G 12/44
[52] U.S. Cl. .......................... 524/592; 524/598; 525/471; 525/519; 525/521
[58] Field of Search ..................................... 525/471, 521, 525/519; 324/592, 598

[56] References Cited

U.S. PATENT DOCUMENTS 3,464,946   9/1969   Downing ................................. 524/598

FOREIGN PATENT DOCUMENTS 0 668 301   8/1995   European Pat. Off. .
1 545 164   1/1970   Germany .
24 41 935   3/1975   Germany .

*Primary Examiner*—Patricia A. Short
*Attorney, Agent, or Firm*—Oblon, Spivak McClelland, Maier & Neustadt, P.C.

[57] ABSTRACT

Hydrophilic, hydrolytically-stable synthetic resins obtainable by reacting a hydroxyl-functional synthetic resin such as a ketone, ketone/aldehyde and/or urea/aldehyde and/or a hydrogenated product of the hydroxyl-functional synthetic resin thereof with a polycarboxylic acid, polycarboxylic anhydride, polycarboxylic ester and/or polycarbonyl halide, where 70–100 mol % of the polycarboxylic acid and/or derivatives is linked chemically via an ester linkage to the hydroxyl-functional synthetic resin by way of only one single function and 0–30 mol % of the acid and/or acid derivative is so linked by way of more than one function.

12 Claims, No Drawings

HYDROPHILIC SYNTHETIC RESINS, ESTERIFIED FOR STABILITY TO HYDROLYSIS, WHICH ARE PARTICULARLY SUITABLE FOR AQUEOUS SYSTEMS

BACKGROUND OF THE INVENTION

1. Field of the Invention

The invention relates to hydrophilic synthetic resins, esterified for stability to hydrolysis, for use in aqueous systems; to a process for their preparation; and to their use.

The hydrolytically-stable hydrophilic synthetic resins of the present invention or an aqueous system produced from the synthetic resin of the present invention, are useful as an additive for aqueous coating systems, inks, including printing inks, and/or color pastes, as thickeners, as dispersing auxiliaries for inorganic and organic pigments, for increasing the solids content of coating systems, for improving the gloss and fullness, for increasing the hardness of the coating, for improving the flow and the adhesion of coatings to metallic substrates, and as agents for the more rapid drying of coating systems for a more rapid decrease in surface tack.

2. Discussion of the Background

Novel synthetic resins are obtained by reacting a hydroxyl-containing ketone, ketone/aldehyde or urea/aldehyde synthetic resins or hydrogenated products of the synthetic resins thereof, such as described in Ullmann's Encyclopedia of Industrial Chemistry, VCH Verlagsgesellschaft mbH, Weinheim 1993, Vol. 23, pp. 99–105 with a polycarboxylic acid and/or a polycarboxylic anhydride; the reaction of the above synthetic resin with a carboxylic acid or anhydride is controlled to such an extent only, so that chemical attachment takes place only via a limited fraction of the existing or potential acid functions, leaving other carboxyl functions unreacted as hydrophilic groups and thus providing for the solubility in water, dilutability in water or dispersibility in water of the synthetic resin hydrophilically modified in this way.

The prior art discloses, in general terms, the hydrolytically-stable addition of hydrophilic carboxyl groups, with the aid of, for example, maleic anhydride, onto resins containing appropriate conjugated or isolated double bonds by a quite different reaction route, by way of a Diels-Alder reaction (DE 24 41 935) and not by esterification. Consequently, the technique of DE 24 41 935 is restricted to synthetic resins which are able to undergo a Diels-Alder reaction.

DE 25 42 090 describes water-soluble compounds which carry sulfonic acid groups and which, in deviation from the novel process, are obtainable in a conjoint condensation reaction from cycloalkanone, formaldehyde and alkali metal bisulfite.

DE 31 44 673 indicates water-soluble condensation products which are likewise obtained by conjoint reaction of ketones, aldehydes and compounds which introduce acid groups. Examples of the latter are sulfites and salts of amidosulfonic acid, aminoacetic acid or phosphorous acid. Both processes, of DE 25 42 090 and DE 31 44 673, give products with a disadvantageous high electrolyte content (e.g. Na+) which can therefore not be employed in coating systems, because the high electrolyte content reduces the important corrosion protection afforded by coatings.

DE 34 06 473 and DE 34 06 474, or EP 0 154 835, describe a process for preparing stable aqueous dispersions of urea/aldehyde resins, or, respectively, ketone/(aldehyde) resins, according to which the resin melt or a highly concentrated solution thereof, is dispersed in water in the presence of organic protective colloids and with or without the addition of an emulsifier.

A disadvantage of these processes according to DE 34 06 473 and DE 34 06 474 is that the organic protective colloids and, if used, emulsifiers interfere with the use of the aqueous ketone/(aldehyde) and urea/aldehyde synthetic resins in the coatings sector: the hydrophilic protective colloids and, if used, emulsifiers remain in the coating and thus render the coating sensitive to moisture; as a result, the coating swells under the effect of moisture, loses hardness and suffers a loss of some of its corrosion protection effect.

Whereas water-insoluble ketone, ketone/aldehyde and urea/aldehyde synthetic resins and the hydrogenated products thereof have been known for a long time (cf. Ullmann's Encyclopedia of Industrial Chemistry, VCH Verlagsgesellschaft mbH, Weinheim 1993, Vol. 23, pp. 99–105), no disclosures have been made of hydrolytically-stable ketone, ketone/aldehyde and urea/aldehyde synthetic resins, esterified with polycarboxylic acids and/or polycarboxylic anhydrides, or the hydrogenated products of such synthetic resins, for use in aqueous systems.

SUMMARY OF THE INVENTION

The present invention provides a hydrophilic, yet hydrolytically-stable synthetic resin, intended in particular for aqueous systems, which is obtained by reacting a hydroxyl-functional ketone, ketone/aldehyde and/or urea/aldehyde synthetic resin, and/or a hydrogenated product of the synthetic resin thereof, with a polycarboxylic acid, a polycarboxylic anhydride, a polycarboxylic ester and/or a polycarbonyl halide, where about 70–100% of the attached polycarboxylic acid and/or derivative is linked chemically via an ester linkage to the synthetic resin by way of only one single function and 0–30% of the polycarboxylic acid, and/or derivative of the polycarboxylic acid, is linked to the synthetic resin by way of more than one function.

The invention is surprising and represents a technical advance in so far as, in accordance with DE 24 41 935, it was not thought as possible to obtain storage-stable aqueous synthetic resins from hydroxyl-containing alkyd resins, rather than the ketone, ketone/aldehyde or urea/aldehyde synthetic resins or the hydrogenated products thereof employed in accordance with the invention, by reaction with polycarboxylic acids and/or polycarboxylic anhydrides. The formation of half-esters with dicarboxylic anhydrides is characterized as "of low stability" (DE 24 41 935, Text p. 1, lines 18–22), "and the resins are able easily to eliminate the dicarboxylic acid again in neutralized aqueous solution, thereby losing the water-solubility of the resin" (DE 24 41 935, Text p. 1, lines 19–22). The novel resins, on the other hand, give rise to very stable neutralized aqueous solutions, dilutions and dispersions, even when stored above room temperature. The novel hydrophilic synthetic resins retain their property of water-solubility, water dilutability or water-dispersibility over a long period, and form aqueous systems which can be stored at room temperature in closed containers for six months without gelling or sedimentation of more than 1% by mass of the resin.

The starting material for preparing the novel water-soluble, water-dilutable or water-dispersible products comprises a water-insoluble hydroxy-functional synthetic resin such as ketone, ketone/aldehyde or urea/aldehyde and/or a hydrogenated product of the synthetic resin thereof, which have softening points (in accordance with DIN 53 180) of between 60 and 180° C. and which are referred to in the text below as "starting resins".

The starting resins are prepared by known methods, mostly by alkali catalyzed condensation, as disclosed, for example, in the following documents: DE 826 974, DE 870 022, DE 890 866, DE 892 975, DE 10 66 020, DE 27 57 176, DE 44 04 809 and EP 0002 793 and, in summary, in Ullmann's Encyclopedia of Industrial Chemistry, VCH Verlagsgesellschaft mbH, Weinheim 1993, Vol. 23, pp. 99–105.

Suitable ketone/aldehyde synthetic resins include, but are not limited to acetophenone-formaldehyde resin (KUNSTHARZ AP synthetic resin, available from Hüls AG) and the hydrogenated products thereof, KUNSTHARZ SK (available from Hüls AG), KUNSTHARZ BL 1280 (available from Hüls AG), methyl ethyl ketone-formaldehyde resin (KUNSTHARZ HPK, available from Hüls AG), cyclohexanone-formaldehyde resin (KUNSTHARZ CA, available from Hüls AG), cyclohexanone/trimethylcyclohexanone-formaldehyde resin (KUNSTHARZ TC, available from Hüls AG), cyclohexanone resin as a ketone resin (LAROPAL K 80, available from BASF), and urea-formaldehyde/isobutyraldehyde resin (LAROPAL A 81, available from BASF).

Suitable polycarboxylic acids and polycarboxylic anhydrides for the preparation of the novel aqueous synthetic resins include, but are not limited to an aromatic, araliphatic, cycloaliphatic and aliphatic polycarboxylic acid and polycarboxylic anhydride. It is also possible, though less preferred, to employ other derivatives of the polycarboxylic acid, such as ester or acid halide.

For the novel process it is also possible to use combinations of dicarboxylic acid and/or anhydride with tricarboxylic acid and/or anhydride and/or tetracarboxylic acid and/or dianhydride.

Suitable dicarboxylic acids include, but are not limited to oxalic, malonic, succinic, methylmalonic, glutaric, dimethylmalonic, adipic, pimelic, suberic, 2,2-dimethylglutaric, azelaic, trimethyladipic, sebacic, fumaric, maleic, itaconic, citraconic, mesaconic, traumatic, muconic, 1,2-cyclohexanedicarboxylic, 1,3-cyclohexanedicarboxylic, 1,4-cyclohexanedicarboxylic, norbornanedicarboxylic, phthalic, isophthalic, terephthalic, 1,4-naphthalenedicarboxylic and 2,5-napthalenedicarboxylic acids of the general formula (I)

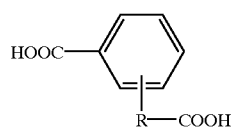

(I)

in which R is an alkyl radical having 2 to 4 carbon atoms which is in ortho, meta or para position with respect to —COOH group, for example carboxyphenylacetic acid, or trimesic acid as a tricarboxylic acid.

Examples of particularly suitable polycarboxylic anhydrides include: phthalic, 1,2-cyclohexanedicarboxylic, 4-methyl-1,2-cyclohexanedicarboxylic, tetrahydrophthalic, trimellitic, maleic and succinic anhydride and pyromellitic dianhydride.

The reaction of the starting resins with the polycarboxylic acids and/or anhydrides takes place preferably in the conjoint melt of 100–250° C. under reduced pressure or with passage of nitrogen in order to expel water of condensation. If desired, it is possible at the same time to use a high-boiling solvent and, if desired, an esterification catalyst, such as preferably an organo tin compound, e.g. $C_4H_9Sn(OOCC_7H_{15})_3$ (FASCAT 4102). One mol of starting synthetic resin can be reacted with from about 0.3 to 3 mol of polycarboxylic acid and/or anhydride, preferably with from about 0.5 to 1.8 mol.

In the context of both the starting resins and the polycarboxylic acid and/or anhydride the compounds involved may comprise mixtures of different types of resin or, respectively, a mixture of two or more polycarboxylic acids and/or anhydrides. All the reactants can be combined in full at the beginning of the reaction, or else can be metered into the reactor separately during the reaction; preferably, however, different polycarboxylic acids and/or anhydrides are not metered in simultaneously as a mixture but are metered in separately at different reaction times.

The progress of the reaction is monitored by way of the acid number (in accordance with DIN 53 402) and the reaction is advantageously terminated as soon as the acid number reached is that anticipated from theory when all of the polycarboxylic acid molecules have attached themselves to the starting resin via at least one ester linkage. To leave polycarboxylic acid molecules unattached in the mixture, although possible, is technically disadvantageous and, therefore, not preferred.

In order to transfer the synthetic resin, hydrophilically modified with carboxylic acid functions, to the aqueous medium the synthetic resins are neutralized with organic and/or inorganic bases such as ammonia and hydrazine. It is preferred to use primary, secondary and tertiary amines, for example ethylamine, propylamine, dimethylamine, dibutylamine, cyclohexylamine, benzylamine, morpholine, piperidine and triethanolamine. With particular preference, tertiary amines are employed as neutralizing agents, especially dimethylethanolamine, triethylamine, tripropylamine and tributylamine.

The amount of neutralizing agent depends on the carboxyl content of the hydrophilic synthetic resin and is advantageously from about 50 to about 130% of the amount of neutralizing agent necessary for stoichiometric neutralization.

The neutralized hydrophilic synthetic resin is added into water, or alternatively and preferably, water is added to said resin. This can be done at 20–150° C., preferably 50–100° C., with the synthetic resin melt or with 50–95% strength, preferably 60–80% strength solutions of the hydrophilic synthetic resin in appropriate solvents.

Appropriate solvents are either those which have a boiling point below 100° C. and can be removed again completely from the finished aqueous system by distillation, such as acetone, methyl ethyl ketone or tetrahydrofuran, or else, if desired, higher-boiling solvents which remain in the water-dilutable system, such as butylglycol, butyldiglycol or N-methylpyrrolidone.

The invention additionally provides for the use of the novel, hydrophilically modified synthetic resins or their aqueous solutions, dilutions or dispersions as additive for an aqueous coating system, as thickener, dispersing auxiliarie for inorganic and organic pigment, for increasing the solids content of a coating system, for improving the gloss and fullness, for increasing the hardness of the coating, for improving the flow and the adhesion of a coating to metallic substrate, and as agent for the more rapid drying of coating system and for a more rapid decrease in surface tack. The novel resins are also suitable as additives for inks, including printing inks, ballpoint pen pastes, and adhesives.

"Aqueous coating system" is used to denote a coating composition in water comprising in addition to the hydrophilic, hydrolytically-stable synthetic resin of the invention, further conventional additives as are known to those skilled in the art such as a filler or a pigment, and which include those described in "Technology of Paints, Varnishes and Lacquers" Edited by C. R. Martens, Robert E. Krieger Publishing Company, Huntington, N.Y. 1968.

Having generally described this invention, a further understanding can be obtained by reference to certain specific examples which are provided herein for the purpose of illustration only and are not intended to be limiting unless otherwise specified.

The following Examples are also described in Priority Document German Patent Application 196 43 703.2, filed Oct. 23, 1996, on which the present application is based and which is incorporated herein by reference.

EXAMPLES

Example 1

A melt of 228 g of KUNSTHARZ BL 1280 (available from Hüls AG), which is an acetophenone/formaldehyde resin hydrogenated in respect of the ketone function and the aromatic ring, prepared according to DE 826 974 or DE 870 022, having molar mass (by vapor pressure osmometry) 830 g/mol and 37 g of 1,2-cyclohexanedicarboxylic anhydride is stirred at 150° C. for 7.5 hours while passing nitrogen through it, until an acid number of 51 mg of KOH/g is reached. The resulting resin is dissolved in 175 g of methyl ethyl ketone, the solution is neutralized with 23 g of dimethylaminoethanol, and the mixture is dispersed by adding 1000 g of fully deionized water. Methyl ethyl ketone is distilled off with effective stirring and the mixture is concentrated until an aqueous synthetic resin dispersion with a solids content of 25% by mass is obtained. The milky-white dispersion of low viscosity has a pH of 9.9 and can be stored at room temperature for more than six months, and at 60° C. for more than 14 days, without more than 1% of the resin sedimenting.

Example 2

A melt of 1350 g of KUNSTHARZ SK (acetophenone/formaldehyde synthetic resin hydrogenated in respect of the ketone function, prepared according to DE 826 974 and/or DE 870 022 and 231 g of 1,2-cyclohexanedicarboxylic anhydride is stirred at 160–170° C. for 1.5 hours and under a reduced pressure of 50–60 hPa, until an acid number of 54 mg of KOH/g is reached. Then 55 g of pyromellitic dianhydride are added and the mixture is stirred at 180–200° C. and under a reduced pressure of 50–60 hPa for further 1.5 hours until an acid number of 58 mg of KOH/g is established. The resulting resin is dissolved at 55° C. in 1000 g of acetone, the solution is neutralized with 157 g of dimethylaminoethanol, and the mixture is dispersed at 60° C. with effective stirring by adding 4700 g of fully deionized water. Acetone and excess water are distilled off with effective stirring and the mixture is concentrated until the dispersion has a solids content of 38% by mass. The milky-white dispersion of low viscosity has a pH of 9.25 and can be stored in closed containers at room temperature for more than six months, and at 60° C. for more than 14 days, without more than 1% by mass of the resin sedimenting.

Example 3

A melt of 225 g of synthetic resin KUNSTHARZ SK (described in Example 2) and 38.5 g of 1,2-cyclohexanedicarboxylic anhydride is stirred at 160° C. and under a reduced pressure of 50–60 hPa for one hour until an acid number of 54 mg KOH/g is reached. A further 38.5 g of 1,2-cyclohexanedicarboxylic anhydride are added and the mixture is stirred at 180–200° C. and at 50–60 hPa for seven hours more until the resin has an acid number of 72 mg of KOH/g. The resulting resin is dissolved at 55° C. in 200 g of acetone, the solution is neutralized with 36 g of dimethylaminoethanol and the mixture is dispersed at 55° C. with 670 g of water. Acetone and excess water are distilled off with an effective stirring until the dispersion has a solids content of 33% by mass. The milky-white dispersion of low viscosity has a pH of 9.3 and can be stored in the closed container for more than 14 days at 60° C. and for more than six months at room temperature without more than 1% by mass of the resin sedimenting.

What is claimed as new and is desired to be secured by Letters Patent of the United States is:

1. A hydrophilic, hydrolytically-stable synthetic resin obtained by reacting a hydroxyl-functional synthetic resin selected from the group consisting of a ketone, ketone/aldehyde, urea/aldehyde and a hydrogenated product of said hydroxy-functional synthetic resin thereof, with an acid or acid derivative selected from the group consisting of a polycarboxylic acid, polycarboxylic anhydride, polycarboxylic ester and polycarbonyl halide;

wherein from about 70 to about 100 mol % of said acid or acid derivative is linked chemically via an ester linkage to said hydroxyl-functional synthetic resin by way of only one carboxyl function of said acid or derivative thereof and from about 0 to about 30 mol % of said acid or acid derivative is linked by way of more than one carboxyl function of said acid or derivative thereof.

2. The hydrophilic, hydrolytically-stable synthetic resin of claim 1, wherein from about 80 to about 100 mol % of said acid or acid derivative is linked chemically via an ester linkage to said hydroxyl-functional synthetic resin by way of only one carboxyl function of said acid or derivative thereof and from about 0 to about 20 mol % of said acid or acid derivative compound is linked by way of more than one carboxyl function of said acid or derivative thereof.

3. The hydrophilic, hydrolytically-stable synthetic resin of claim 1, wherein said hydroxyl-functional synthetic resin is selected from the group consisting of acetophenone-formaldehyde resin, methyl ethyl ketone-formaldehyde resin, cyclohexanone-formaldehyde resin, cyclohexanone/trimethylcyclo-hexanone-formaldehyde resin, cyclohexanone resin and urea-formaldehyde/isobutyraidehyde resin.

4. The hydrophilic, hydrolytically-stable synthetic resin of claim 1, wherein said polycarboxylic acid is selected from the group consisting of oxalic, malonic, succinic, methylmalonic, glutaric, dimethylmalonic, adipic, pimelic, suberic, 2,2-dimethylglutaric, azelaic, trimethyladipic, sebacic, fumaric, maleic, itaconic, citraconic, mesaconic, traumatic, muconic, 1,2-cyclohexanedicarboxylic, 1,3-cyclohexanedicarboxylic, 1,4-cyclohexanedicarboxylic, norbomanedicarboxylic, phthalic, isophthalic, terephthalic, 1,4-napthalenedicarboxylic, 2,5-napthalenedicarboxylic acids and an acid of the general formula (I):

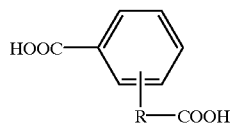

in which R is an alkyl radical having 2 to 4 carbon atoms, and where R—COOH is attached to the aromatic ring in ortho, meta or para position.

5. The hydrophilic, hydrolytically-stable synthetic resin of claim 4, wherein said polycarboxylic acid represented by formula (I) is selected from the group consisting of carboxyphenylacetic acid and trimesic acid.

6. The hydrophilic, hydrolytically-stable synthetic resin of claims 1, wherein said polycarboxylic anhydride is selected from the group consisting of phthalic, 1,2-cyclohexanedicarboxylic, 4-methyl-1,2-cyclohexanedicarboxylic, tetrahydrophthalic, trimellitic, maleic, succinic anhydride and pyromellitic dianhydride.

7. An aqueous system comprising a hydrophilic, hydrolytically-stable synthetic resin obtained by reacting a hydroxyl-functional synthetic resin selected from the group consisting of a ketone, ketone/aldehyde, urea/aldehyde and a hydrogenated product of said hydroxyfunctional synthetic resin thereof, with an acid or acid derivative selected from the group consisting of a polycarboxylic acid, polycarboxylic anhydride, polycarboxylic ester and polycarbonyl halide; wherein from about 70 to about 100 mol % of said acid or acid derivative is linked chemically via an ester linkage to said hydroxyl-functional synthetic resin by way of only one carboxyl function of said acid or derivative thereof and from about 0 to about 30 mol % of said acid or acid derivative is linked by way of more than one carboxyl function of said acid or derivative thereof.

8. A process for preparing a hydrophilic, hydrolytically-stable synthetic resin, comprising:

reacting a hydroxyl-functional synthetic resin selected from the group consisting of a ketone, ketone/aldehyde, urea/aldehyde, and a hydrogenated product of said hydroxylfunctional synthetic resin thereof, with an acid or acid derivative selected from the group consisting of a polycarboxylic acid, polycarboxylic anhydride, polycarboxylic ester, polycarbonyl halide and a mixture thereof, in the melt or in solution, in such a way that about 70 to about 100 mol % of said acid or acid derivative is linked chemically via an ester linkage to said hydroxyl-functional synthetic resin by way of only one carboxyl function of said acid or derivative thereof and from about 0 to about 30 mol % of said acid or acid derivative is so linked by way of more than one carboxyl function of said acid or derivative thereof; and wherein from about 0.3 to about 3 mol, of said acid or acid derivative is reacted per mol of said hydroxyl-functional synthetic resin.

9. The process of claim 8, wherein from about 80 to about 100 mol % of said acid or acid derivative is linked chemically via an ester linkage to said hydroxyl-functional synthetic resin by way of only one carboxyl function of said acid or derivative thereof and from about 0 to about 20 mol % of said acid or acid derivative is linked by way of more than one carboxyl function of said acid or derivative thereof; and wherein from about 0.3 to about 3 mol, of said acid or acid derivative is reacted per mol of said hydroxyl-functional synthetic resin.

10. The process of claim 8, further comprising neutralizing said melt in solution to form a neutralized melt or solution.

11. The process of claim 10, further comprises adding water to said neutralized melt or solution or adding said melt or solution into water.

12. The process of claim 10, further comprising neutralizing said melt or solution with an amine.

* * * * *

UNITED STATES PATENT AND TRADEMARK OFFICE
CERTIFICATE OF CORRECTION

PATENT NO. : 5,962,582
DATED : October 5, 1999
INVENTOR(S) : Hartwig LANGE

It is certified that error appears in the above-identified patent and that said Letters Patent is hereby corrected as shown below:

On the title page, item [30] has been omitted. It should be:

--[30]    Foreign Application Priority Data
    Oct. 23, 1996  [DE] Germany ............. 196 43 703--

Signed and Sealed this

Ninth Day of January, 2001

Attest:

Q. TODD DICKINSON

*Attesting Officer*      *Commissioner of Patents and Trademarks*